United States Patent [19]
Iwamura et al.

[11] Patent Number: 5,439,040
[45] Date of Patent: Aug. 8, 1995

[54] PNEUMATIC RADIAL TIRE INCLUDING A TREAD WITH TIE BARS

[75] Inventors: Wako Iwamura; Yasuhiro Narahara, both of Hyogo, Japan

[73] Assignee: Sumitomo Rubber Industries, Ltd., Kobe, Japan

[21] Appl. No.: 167,093

[22] Filed: Dec. 16, 1993

[30] Foreign Application Priority Data

Dec. 16, 1992 [JP] Japan .................. 4-353874

[51] Int. Cl.⁶ .............. B60C 11/13; B60C 11/24
[52] U.S. Cl. ..................... 152/209 R; 152/209 A
[58] Field of Search .......... 152/209 R, 209 A, 209 D, 152/209 B

[56] References Cited

U.S. PATENT DOCUMENTS

| | | | |
|---|---|---|---|
| 3,012,599 | 12/1961 | Benson et al. | 152/209 R |
| 4,258,769 | 3/1981 | Makino et al. | 152/209 R |
| 4,332,286 | 6/1982 | Takigawa et al. | 152/209 R |
| 4,353,402 | 10/1982 | Burche et al. | 152/209 R |
| 4,461,334 | 7/1984 | Tansei et al. | 152/209 R |
| 4,785,863 | 11/1988 | Tsuda et al. | 152/209 R |
| 4,815,512 | 3/1989 | Gerresheim et al. | 152/209 R |
| 5,088,536 | 2/1992 | Graas et al. | 152/209 R |
| 5,137,068 | 8/1992 | Loidl et al. | 152/209 R |
| 5,176,766 | 1/1993 | Landers et al. | 152/209 R |
| 5,238,038 | 8/1993 | Glover et al. | 152/209 R |

FOREIGN PATENT DOCUMENTS

| | | | |
|---|---|---|---|
| 0455925 | 11/1991 | European Pat. Off. | |
| 0477542 | 4/1992 | European Pat. Off. | |
| 0508090 | 10/1992 | European Pat. Off. | |
| 1096945 | 6/1955 | France | |
| 8628836 | 2/1988 | Germany | |
| 1036506 | 2/1989 | Japan | 152/209 D |
| 309806 | 12/1989 | Japan | 152/209 D |
| 0041908 | 2/1990 | Japan | 152/209 D |
| 3182814 | 8/1991 | Japan | 152/209 D |
| 4038208 | 2/1992 | Japan | 152/209 B |
| 754438 | 8/1956 | United Kingdom | |
| 0869980 | 6/1961 | United Kingdom | |
| 2250488 | 6/1992 | United Kingdom | 152/209 D |

OTHER PUBLICATIONS

Abstract of JA 4-38208.

*Primary Examiner*—Steven D. Maki

[57] ABSTRACT

The invention relates to a pneumatic radial tire that has a tread of straight grooves of broad and narrow widths and which is adapted to insure sufficient rigidity in the tread to provide better steering stability. Tie bars are provided in straight sub-grooves of narrow width one of which is located between an inner middle block and an outer middle block, thereby reinforcing the acute-angled portions of the inner and outer middle blocks. Each tie bar consists of an inner tie bar with length $L_1$ that extends in contact with the land angle of $\alpha_1$ of the inner middle block and an outer tie bar with length $L_2$ that extends in contact with the land angle $\alpha_2$ of the outer middle block.

4 Claims, 1 Drawing Sheet

PNEUMATIC RADIAL TIRE INCLUDING A TREAD WITH TIE BARS

The present invention relates to a pneumatic radial tire that is provided with a tread pattern having straight grooves that extend circumferentially around the tread.

BACKGROUND OF THE INVENTION

Recent models of passenger car tires are in many cases provided with a rib pattern, or a tread pattern that has straight grooves extending circumferentially around the tread, because it offers the following advantages: small rolling resistance, good ride characteristics, good steering stability, low noise that develops between the tire and the road surface, and less likelihood of "hydroplaning" in the presence of a water film on the road surface.

In order to further reduce the noise that develops between the tire and the road surface and to suppress more effectively the occurrence of "hydroplaning" in the presence of a water film on the road surface while enhancing the drive and brake forces, various approaches are being adopted. These approaches include increasing not only the number of straight grooves, but also the number of lug grooves that intersect with the straight grooves to extend transversely across the tread, as well as increasing the angle the lug grooves form with respect to the straight grooves.

However, if the number of straight grooves and lug grooves are simply increased in the conventional pneumatic radial tires, the area of each of the blocks that are formed by the straight grooves and lug grooves will decrease, leading to lower rigidity of the blocks and poor steering ability.

SUMMARY OF THE INVENTION

An object, therefore, of the present invention is to provide a pneumatic radial tire that has straight grooves of broad and narrow widths and which is adapted to insure sufficient rigidity in the tread to provide better steering stability.

The object of the present invention can be attained by a pneumatic radial tire having at least one straight groove of broad width that extends circumferentially around the tread, at least one straight groove of narrow width that also extends circumferentially around the tread, and a plurality of lug grooves that extend transversely across the tread, the straight groove of narrow width and the lug grooves combining to form acute-angled blocks that each have a land angle $\alpha$ that is greater than zero degrees but less than 70 degrees ($0° < \alpha < 70°$), and tie bars with a circumferential length of $L_1$ and a depth of $D_1$ being provided within the straight groove of narrow width between blocks that are adjacent to each in the traverse direction of the tread, the tie bars satisfying the following relationships:

$L_1 \geq 0.7 \cdot A$ $0.1 \cdot D \leq D_1 \leq 0.5\, D$ $D - 1.6\, mm \leq D_2 \leq (D - 1.6\, mm) \times 0.5$ $D_1 < D_2$ where $D_2$ is the depth of the straight groove of narrow width in which the tie bars are provided;

$D$ is the depth of a groove that is provided with a wear indicator; and $A$: the length of the side of each block that faces the lug groove and which forms the land angle $\alpha$ as taken along either of the two straight grooves.

Since the tread having straight grooves of broad width is also provided with straight grooves of narrow width, the ratio of $S_G$ (the total are of openings in the groove regions) to $S_L$ (the total area of the land regions, i.e., those block surfaces in the tread which come in contact with the road surface) increases sufficiently to permit more effective water drainage, and those grooves serve as sipes to provide better wet performance in the presence of a water film on the road surface and offer better ride characteristics.

In accordance with the present invention, the straight grooves of narrow width combine with the lug grooves to form acute-angled blocks that each have a land angle $\alpha$ which is greater than zero degrees but less than 70 degrees ($0° < \alpha < 70°$) with respect to the straight grooves and this design contributes even better ride characteristics.

Furthermore, tie bars having a circumferential length of $L_1$ and a depth of $D_1$ are provided within the straight groove of narrow width between blocks that are adjacent to each other in the transverse direction of the tread. The tie bars which satisfy the four conditions set forth above will reinforce the acute-angled portions of the blocks to make them more rigid, thereby improving the steering stability characteristics of the tire.

BRIEF DESCRIPTION OF THE DRAWINGS

An embodiment of the present invention is described below with reference to the accompanying drawings.

DETAILED DESCRIPTION OF THE INVENTION

Figure 1:
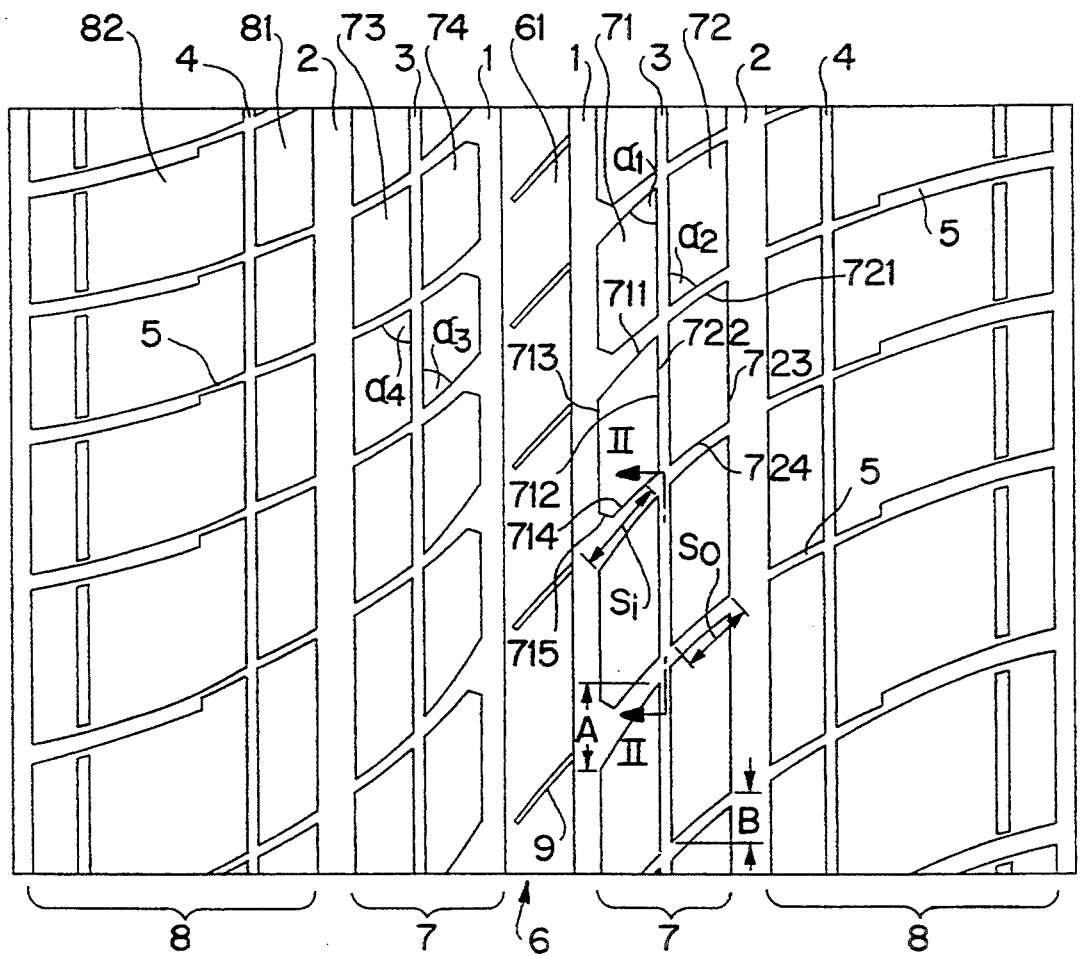
FIG. 1 is the tread pattern of a tire according to an embodiment of the present invention.

As shown in FIG. 1, the tread of the tire is provided in the central portion with two spaced straight center grooves 1 of broad width that extend circumferentially around the tread. A straight middle groove 2 of wide width that also extends circumferentially around the tread is provided transversely outwards of the tread as it is spaced by a given distance from each of the center grooves 1.

Between the center groove 1 and the adjacent straight middle groove 2, there is provided a straight sub-groove 3 that is narrower than both grooves 1 and 2 and which extends circumferentially around the tread. A shoulder straight sub-groove 4 that is narrower than both grooves 1 and 2 and which extends circumferentially around the tread is provided transversely outwards of the middle groove 2 as the two are separated by a given distance.

To take a typical example, the sub-groove 3 and the shoulder straight sub-groove 4 are adapted to have a width of 0.5 to 3.0 mm and their depth is controlled to be 80% to 15% of the depth of the grooves that are provided with wear indicators (which are usually the center groove 1 and the middle groove 2). If the width of the sub-groove 3 and the shoulder sub-groove 4 is less than 0.5 mm, there will be a shortage in the capability for water drainage.

It should be noted that the grooves 1 to 4 need not be strictly straight and may be in a zigzag form.

With the arrangement just described above, the ratio of $S_G$ (the total area of openings in the groove regions to $S_L$ (the total area of land portions i.e., those block surfaces in the tread which come in contact with the road surface) increases sufficiently to permit more effective water drainage and the grooves serve as sipes to provide better wet performance in the presence of a water film on the road surface and offer better ride characteristics.

A plurality of lug grooves 5 that intersect with each group of the grooves 1 to 4 at predetermined angles extend from the center groove 1 to the end of the tread in its transverse direction in such a way that those lug grooves 5 are provided on either side of the two center grooves 1 taken as a unit. The lug grooves 5 on the opposite sides of the unit of center grooves 1 are arranged to have point symmetry with respect to a point on the centerline through the tread.

A row of center blocks 6 are formed between two center grooves 1; a row of middle blocks 7 are formed between each center groove 1 and one of the middle grooves 2; and a row of shoulder blocks 8 are formed transversely outwards of each middle groove 2.

The row of center blocks 6 have comparable angles to the lug grooves 5 with respect to the circumferential direction of the tread and a plurality of center blocks 61 are formed in segments as divided by sipes 9 that align with the lug grooves on both sides of the unit of center grooves 1.

A row of middle blocks 7 is provided on both sides of the single row of center blocks 6. Each row of middle blocks consists of inner middle blocks and outer middle blocks that are defined by sub-grooves 3 and lug grooves 5. As shown, the inner middle blocks are designated by 71 and 74, and the outer middle blocks are designated by 72 and 73.

The row of shoulder blocks 8 is provided on both farther sides of the single row of center blocks 6. Each row of shoulder blocks consists of inner shoulder blocks 81 and outer shoulder blocks 82 that are defined by shoulder sub-grooves 4 and lug grooves 5.

Each of the inner middle blocks 71 in the row of middle blocks 7 that is located on the right side of FIG. 1 comprises a step-in side 711 that faces the lug groove 5 in the step-in portion, an outer lateral side 712 that faces the sub-groove 3, an inner lateral side 713 that faces the center groove 1, a kickout side 714 that faces the lug groove 5 in the kickout portion, an oblique side 715 that faces both the center groove-1 and the lug groove 5 in the kickout portion. Each of the outer middle blocks 72 comprises a step-in side 721 that faces the lug groove 5 in the step-in portion, an inner lateral side 722 that faces the sub-groove 3, an outer lateral side 723 that faces the middle groove 2, and a kickout side 724 that faces the lug groove 5 in the kickout portion.

The acute vertical angle formed by the groove 3 and the lug groove 5 in each inner middle block 71 may be defined as a land angle $\alpha_1$; namely, the acute vertical angle formed by the step-in side 711 and the outer lateral side 712 may be defined as the land angle $\alpha_1$ of inner middle block 71. On the other hand, the acute vertical angle formed by the inner lateral side 722 and the kickout side 724 in each outer middle block 72 may be defined as land angle $\alpha_2$. In accordance with the present invention, each of the land angles $\alpha_1$ and $\alpha_2$ is set to be greater than zero degrees but less than 70 degrees ($0° < \alpha_1 < 70°$; $0° < \alpha_2 < 70°$).

Figure 2:
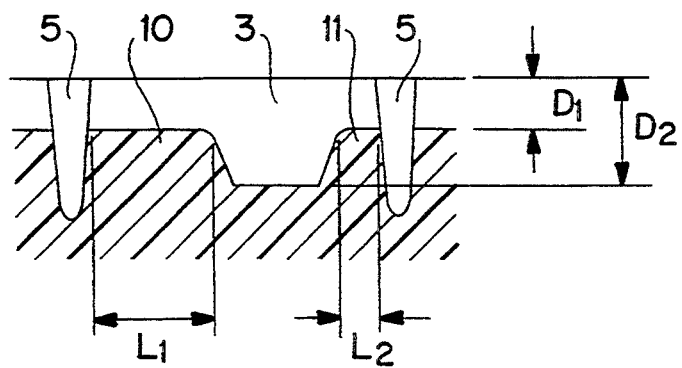
FIG. 2 is a diagram showing a section of FIG. 1 as taken on line II—II.

As FIG. 2 shows, the sub-groove 3 which is located between the row of inner middle blocks 71 and the row of outer middle blocks 72 is furnished with tie bars that reinforce the acute-angled portions of each of the inner middle blocks 71 and outer middle blocks 72.

Each tie bar consists of an inner tie bar 10 and an outer tie bar 11. The inner tie bar 10 having a length of $L_1$ contacts the land angle $\alpha_1$ of each inner middle block 71 (namely, it contacts the outer lateral side 712) and extends from the site where the side wall of the lug groove 5 faced by the step-in side 711 intersects with the sub-groove 3. The outer tie bar 11 having a length of $L_2$ contacts the land angle $\alpha_2$ of each outer middle block 72 (namely, it contacts the inner lateral side 722) and extends from the site where the side wall of the lug groove 5 faced by the kickout side 724 intersects with the sub-groove 3. Various parameters of the tie bars and associated components are written using the following symbols: $D_1$ for the depth of each of the inner tie bar 10 and outer tie bar 11 as measured from the surface of the tread; $D_2$ for the depth of the sub-groove 3 between the inner tie bar 10 and the outer tie bar 11; $D$ for the depth of the grooves that are provided with wear indicators (which are usually the center grooves 1 and the middle grooves 2); $s_i$ for the length of the step-in side 711 of each inner middle block 71; A for the length of the step-in side 711 as taken along the sub-groove 3; $s_o$ for the length of the kickout side 724 of each outer middle block 72; and B for the length of the kickout side 724 as taken along the sub-groove 3. Unless $D_1$ is 50% of D or less, the tie bars will not produce satisfactory reinforcing effects. On the other hand, the greater the value of $D_2$, which refers to the depth of those portions of the sub-groove 3 where no tie bars are provided, the better is the appearance of the tire in the middle and subsequent phases of wear. Under these circumstances, the following relationships will hold:

$$L_1 \geq 0.7 \cdot A \ (L_1 \geq 0.7 \cdot s_i \cdot \cos \alpha_1)$$

$$L_2 \geq 0.7 \cdot B \ (L_2 \geq 0.7 \cdot s_o \cdot \cos \alpha_2)$$

$$0.1 \cdot D \leq D_1 \leq 0.5 \ D$$

$$D - 1.6 \ mm \leq D_2 \leq (D - 1.6 \ mm) \times 0.5$$

$$D_1 < D_2$$

where
$A = s_i \cdot \cos \alpha_1$ and $B = s_o \cdot \cos \alpha_2$

The inner middle blocks 73 and the other middle blocks 74 in the row of middle blocks 7 which are located on the left side of FIG. 1 are formed to have point symmetry with the inner middle blocks 71 and the other middle blocks 72 in the right row of middle blocks 7 with respect to a point on the centerline through the tread. Thus, the relationship between step-in and kickout portions in the left row of middle blocks is opposite to that in the right row of middle blocks. Stated more specifically, the land angle $\alpha_3$ which is the acute angle that is located in the kickout portion of the inner middle block 74 corresponds to the land angle $\alpha_1$ of the inner middle block 71, whereas the land angle $\alpha_4$ of the outer middle block 73 corresponds to the land angle $\alpha_2$ of the outer middle block 72. The former two land angles are the same ($\alpha_1 = \alpha_3$) and the latter two are also the same ($\alpha_2 = \alpha_4$), with the tie bars being in conformity with the respective acute angles formed in a similar manner to each other.

A tire was constructed in accordance with an example of the present invention and tested for comparison with tires of the conventional structure according to Comparative Examples I to IV. The results of the test are shown in Table 1 below.

All tires under test had the size 185/60R14. The tire of Comparative Example I had the tie bars of dimensions outside the ranges specified by the present invention; the tire of Comparative Example II had no tie bars; the tire of Comparative example III was characterized in that all (fine) straight grooves of narrow width that extended circumferentially were designed to have a shallow depth; and the tire of Comparative example IV had no straight grooves of narrow width that extended circumferentially.

The greater the values of test data that are shown in Table 1, the better.

TABLE 1

| | Ex. | Comp. Ex. I | Comp. Ex. II (without tie bars) | Comp. Ex. III (all fine grooves shallow) | Comp Ex. IV (without fine grooves) |
|---|---|---|---|---|---|
| Tie bar installation dimensions | 0.75 A | 0.5 A | — | — | — |
| | 0.8 B | 0.9 B | — | — | — |
| | 3.0 mm | 3.0 mm | 5.0 mm | 3.0 mm | — |
| | 5.0 mm | 5.0 mm | 5.0 mm | 3.0 mm | — |
| | 8.0 mm | 8.0 nm | 8.0 mm | 8.0 mm | 8.0 mm |
| Steering stability | 3 | 3 | 2.8 | 3+ | 3.1 |
| Ride | 3 | 3 | 3+ | 2.9 | 2.8 |
| Hydroplaning | 3 | 3 | 3 | 3 | 3− |
| Wet performance in the presence of water film | 3 | 3 | 3 | 3 | 3− |
| Appearance after test on steering stability | 3 | 2.8 | 2.6 | 3+ | 3+ |
| Appearance in the middle and subsequent phases of wear | 3− | 3− | 3 | 2.9 | 3 |
| Noise on cornering pattern | 3 | 3− | 2.9 | 3 | 3 |

As is clear from Table 1, the tire of the example was satisfactory in terms of steering stability, wet performance and appearance.

Having the construction described hereinabove, the present invention offers the following advantages. Since the tread having straight grooves of broad width is also provided with straight grooves of narrow width, the ratio of $S_G$ (the total area of openings in the groove regions) to $S_L$ (the total area of the land regions, i.e., those block surfaces in the tread which come in contact with the road the surface) increases sufficiently to permit more effective water drainage, and those grooves serve as sipes to provide better wet performance in the presence of a water film on the road surface and offer better ride characteristics.

The straight grooves of narrow width combine with the lug grooves to form acute-angled blocks that each have a land angle $\alpha$ which is greater than zero degrees but less than 70 degrees ($0° < \alpha < 70°$) with respect to the straight grooves and this design contributes even better ride characteristics.

Furthermore, tie bars having a circumferential length of $L_1$ and a depth of $D_1$ are provided within the straight groove of narrow width between blocks that are adjacent to each other in the transverse direction of the tread. The tie bars which satisfy the four conditions set forth hereinabove will reinforce the acute-angled portions of the blocks to make them more rigid, thereby improving the steering stability characteristics of the tire.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What we claim is:

1. A pneumatic tire having a tread including at least one straight groove of broad width extending circumferentially around the tread, said at least one straight groove of broad width being provided with a wear indicator, at least one straight groove of narrow width extending circumferentially around the tread, and a plurality of lug grooves extending transversely across the tread, the at least one straight groove of narrow width and the lug grooves combining to form a circumferential row of a first plurality of acute-angled blocks and a circumferential row of a second plurality of acute-angled blocks, each of the first plurality of blocks having a land angle $\alpha_1$ at the tread surface that is greater than zero degrees but less than 70 degrees ($0° < \alpha_1 < 70°$) to the circumferential direction of the tire, each of the second plurality of blocks having a land angle $\alpha_2$ at the tread surface that is greater than zero degrees but less than 70 degrees ($0° < \alpha_2 < 70°$) to the circumferential direction of the tire, a first tie bar and a second tie bar located between each of the first plurality of acute-angled blocks and an adjacent one of the second plurality of acute-angled blocks and disposed within the at least one straight groove of narrow width, each of said first tie bars having a circumferential Length of $L_1$ and a depth of $D_1$, said tread satisfying the following relationships:

$$L_1 \geq 0.7 \cdot A$$

$$0.1 \cdot D \leq D_1 \leq 0.5 \cdot D$$

$$D - 1.6 \, mm \leq D_2 \leq (D - 1.6 \, mm) \times 0.5$$

$$D_1 \leq D_2$$

wherein
$D_2$ is the depth of the at least one straight groove of narrow width between said first and second tie bars;
D is the depth of the straight groove of broad width that is provided with the wear indicator;
A is the circumferential length of the side of each of said first plurality of acute-angled blocks that faces the lug groove and which forms the land angle $\alpha_1$ and wherein each of said second tie bars has a circumferential length of $L_2$ and a depth of $D_2$, said second tie bars satisfying the following relationship:

$$L_2 \leq 0.7 \cdot B$$

wherein B is the circumferential length of the side of each of said second plurality of acute-angled blocks that faces the lug groove and which forms the land angle $\alpha_2$.

2. The tire according to claim 1, wherein each of said first tie bars contacts the portion forming the land angle $\alpha_1$ of a respective one of the first blocks, and each of said second tie bars contacts the portion forming the land angle $\alpha_2$ of a respective one of the second blocks.

3. The tire according to claim 2, wherein the tread includes a unit of center grooves, the at least one groove of broad width being one of the center grooves, and the lug grooves are arranged on opposite sides of the unit of center grooves to have point symmetry with respect to point on the centerline through the tread of said tire.

4. The tire according to claim 1, wherein the tread includes a unit of center grooves, the at least one groove of broad width being one of the center grooves, and the lug grooves are arranged on opposite sides of the unit of center grooves to have point symmetry with respect to point on the centerline through the tread of said tire.

* * * * *

UNITED STATES PATENT AND TRADEMARK OFFICE
CERTIFICATE OF CORRECTION

PATENT NO.   : 5,439,040
DATED        : August 8, 1995
INVENTOR(S)  : Iwamura et al.

It is certified that error(s) appears in the above-identified patent and that said Letters Patent is hereby corrected as shown below:

Column 1, line 64 change "D-1.6 mm $\leq D_2 \leq$ (D-1.6 mm) x 0.5" to --D-1.6 mm $\geq D_2 \geq$ (D-1.6 mm) x 0.5--;

Column 4, line 48 change "D-1.6 mm $\leq D_2 \leq$ (D-1.6 mm) x 0.5" to --D-1.6 mm $\geq D_2 \geq$ (D-1.6 mm) x 0.5-- and Claim 1 (Column 6, line 51) change "D-1.6 mm $\leq D_2 \leq$ (D-1.6 mm) x 0.5" to --D-1.6 mm $\geq D_2 \geq$ (D-1.6 mm) x 0.5--.

Signed and Sealed this

Seventeenth Day of November, 1998

*Attest:*

BRUCE LEHMAN

*Attesting Officer*     *Commissioner of Patents and Trademarks*